Dec. 22, 1959  C. H. TITUS  2,918,547
ELECTROMAGNETIC DEVICE
Filed March 12, 1957

Inventor:
Charles H. Titus,
by J. Wesley Haubner
His Attorney.

United States Patent Office 2,918,547
Patented Dec. 22, 1959

2,918,547

ELECTROMAGNETIC DEVICE

Charles H. Titus, Havertown, Pa., assignor to General Electric Company, a corporation of New York Application March 12, 1957, Serial No. 645,473

5 Claims. (Cl. 200—87)

This invention relates to an electromagnetic device, and more particularly to an improved electromagnetic time delay overcurrent protective relay having relatively low inductance.

The present day growth of the electronics industry has produced a need for an improved electromagnetic protective relay having heretofore unavailable characteristics and capabilities. Such a relay must be able successfully to perform a protective function in an electric power circuit supplying discontinuous direct current to a load circuit which may comprise, for example, a plurality of series resistor-capacitor decoupling circuits, successive pulses of direct current being supplied to said load circuit at a frequency which may vary over a range such as 100 to 10,000,000 cycles per second.

In an application such as that outlined briefly above, operation by the protective relay must not take place during transient conditions wherein the circuit current momentarily surges above its rated value. Accordingly, it is an object of this invention to provide an improved electromagnetic relay which will operate with inverse time delay, i.e., with time delay that will decrease as the severity of an overcurrent or fault condition increases.

In the above mentioned application, any significant reactance presented by the relay to the high-frequency pulsating current might cause an abnormal and undesirable variation in the voltage level of parallel-connected load circuits. Therefore, it is a further object of this invention to provide an improved electromagnetic relay having extremely low inductance so that the inductive reactance in the protected circuit is a minimum.

In electronic equipment there is usually an emphasis on physical compactness, and available space is at a premium. Another object of the invention, therefore, is to provide an improved electromagnetic relay of relatively small size.

Still another object of the invention is the provision of an electromagnetic device having one terminal of its energizing winding arranged to provide means for mounting the device, whereby the device may be mounted on an electrical bus which is connected to one pole of the source of electric energy.

In carrying out my invention in one form, I provide a helical winding for producing magnetic flux when energized and a non-magnetic electroconductive casing substantially totally enclosing the winding. The casing is adapted for mounting on a suitable support, and one end of the winding is electrically connected to the casing. The other end of the winding together with the casing provide energizing terminals for said winding. A magnetizable frame member is attached to the casing and disposed to provide a magnetic path for the flux produced by the winding. A magnetizable armature pivotally supported by the frame member is movable in response to electromagnetic attraction to perform a circuit controlling function.

My invention will be better understood and further objects and advantages will be apparent from the following description taken in conjunction with the accompanying drawing in which.

Figure 1:
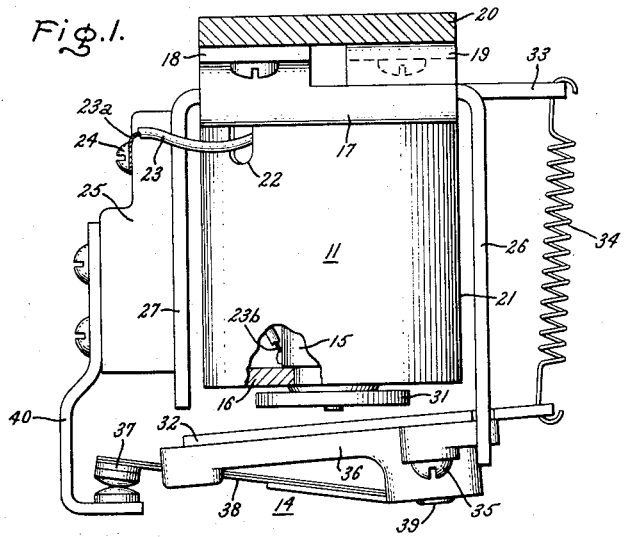
Fig. 1 is a side elevation of an electromagnetic relay constructed in accordance with my invention.

With reference now to the drawing, the illustrated electromagnetic relay may be seen to comprise essentially a casing or jacket 11, a helical energizing winding 12 incased by the jacket (see Fig. 3), a frame member 13, and an armature 14.

Figure 3:
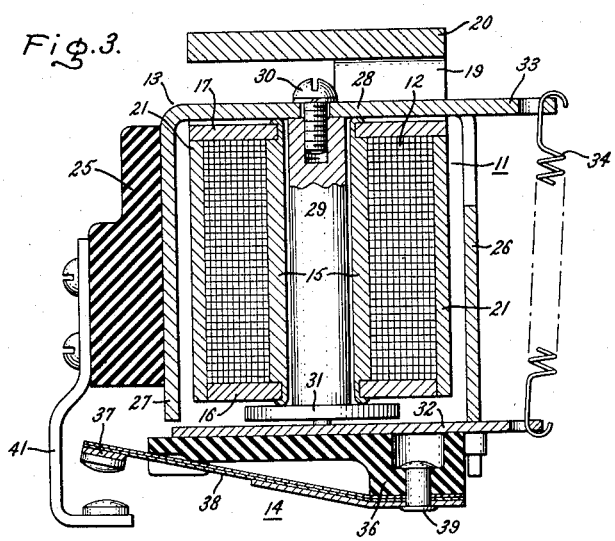
Fig. 3 is a sectional view of the relay of Fig. 2 along the line 3—3 but with the armature in an attracted position.

The casing or jacket 11 comprises a sheath of non-magnetic electroconductive material, such as copper or the like. As can be seen in Fig. 3, an elongated central body portion of casing 11 comprises a cylinder-shaped or tubular inner side wall 15. A ring-shaped end wall or flange 16 is disposed at one end of side wall 15 and secured thereto by suitable means. At the other end of side wall 15 is affixed another ring-shaped flange 17 having a pair of L-shaped mounting feet 18 and 19 extending from opposite sides thereof. The inner side wall 15 together with the end flanges 16 and 17 provide a spool for the energizing winding 12. By means of the mounting feet 18 and 19, which are offset with respect to each other as indicated in Fig. 1, casing 11 may be mounted on a suitable support such as the illustrated bar 20. Bar 20 is intended to represent an electric conductor or bus which may be connected to one pole of a direct current source of electric energy, not shown. A plurality of similar relays each associated with different parallel load circuits, not shown, might be mounted adjacent to each other on the common bus bar 20.

The casing 11 includes a cylinder-shaped outer sidewall 21 having a diameter greater than that of the inner side wall 15. The outer wall 21 is affixed at opposite ends to the end walls 16 and 17, and thus the casing or jacket 11 substantially wholly surrounds the winding 12. A slot or opening 22 is provided in the outer wall to accommodate an insulated electric current conductor 23.

The insulated conductor 23 is wound on the spool provided by side wall 15 and flanges 16 and 17 to form the energizing winding 12 which is substantially completely incased by jacket or casing 11. One end 23a of conductor 23 is brought without casing 11 through slot 22 in the outer side wall 21 for connection to a terminal screw 24 located on a block 25. The block 25 comprises electrical insulating material mounted on frame member 13. Screw 24 provides a first energizing terminal for winding 12, and this terminal is available for connection to the individual circuit (not shown) being protected by the relay.

The other end 23b of the conductor 23 which comprises winding 12 is electrically connected to casing 11 by means of solder or the like. This connection may be made on the outer periphery of the inner side wall 15, as is shown in Fig. 1, and in order to improve electrical conductivity between casing 11 and end 23b, side wall 15 may be silver plated. With this arrangement, the flange 17, in conjunction with its mounting feet 18 and 19, provides a second energizing terminal for winding 12. Thus, winding 12 is energized by electric current flowing from bus bar 20 to the protected circuit which is connected to terminal 24. When energized, winding 12 produces magnetic flux.

The frame member 13 is made of magnetizable material, and therefore it provides a magnetic path for flux produced by the winding 12. As can be seen in Fig. 3, frame 13 comprises two spaced apart elongated components or members 26 and 27 suitably attached at one end to a common transverse component or member 28. Spaced intermediate members 26 and 27 is a third elongated member or core 29 which is attached at one end of the transverse member 28 by means of a screw 30 or the like. The opposite end of core 29 comprises a circular pole face or disk 31. Core 29 is coaxially disposed within the hollow body portion 15 of casing 11, but the diameter of disk 31 is greater than the diameter of the opening in body portion 15. Consequently, as is shown in Fig. 3, the body portion 15 is captured between disk 31 and member 28, and in this member frame 13 is attached to the casing 11.

The armature 14 is disposed transversely across the free ends of the elongated members 26, 27 and 29 of frame 13. The armature comprises a bar 32 of magnetizable material pivotally supported near one end by a cooperating notch located in the free end of member 26. The pivoted end of bar 32 extends beyond member 26 and is connected to a corresponding protrusion 33 of member 28 by means of a tension spring 34. Tension spring 34 supplies a bias force to tilt armature 14 counterclockwise toward a normally unattracted position in which it is shown in Fig. 1. The armature is moved to a magnetically attracted position, which has been shown in Fig. 3, by the force of electromagnetic attraction resulting from energization of winding 12 by a predetermined overcurrent for greater than a predetermined length of time. In its attracted position, armature 14 and frame 13 form a magnetic circuit, with minimum or no air gap between bar 32 and the members 27 and 29.

Fastened to bar 32 of the movable armature 14 by means of a pair of screws 35 is an electrical insulating member 36. A bridging contact member 37 is attached to member 36 by means of a contact arm 38 and a rivet 39. A pair of stationary contacts 40 and 41 are disposed in cooperating relationship with the bridging member 37. The insulating block 25, which is secured to member 27 of frame 13, supports the stationary contacts 40 and 41 in a desired position.

Figure 2:
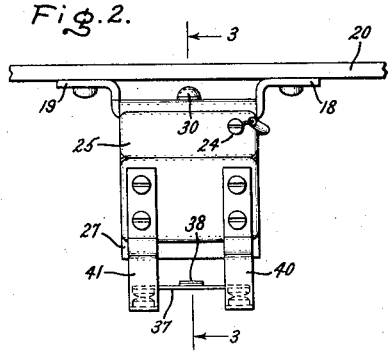
Fig. 2 is a front elevation of the illustrated embodiment of my invention.

With the armature 14 in its unattracted position, bridging contact member 37 engages the stationary contacts 40 and 41 as shown in Figs. 1 and 2. Upon movement of the armature to its attracted position, the respective contacts are separated, as is indicated in Fig. 3. Contacts 40 and 41 may be connected to an external circuit for controlling the operation of a circuit interrupter or the like, not shown. Thus, it may be assumed that by opening the circuit connected to contacts 40 and 41, movement of armature 14 toward its attracted position initiates a protective action such, for example, as causing the circuit interrupter to operate thereby alleviating the overcurrent condition in the energizing winding 12 and the connected load circuit.

From the foregoing detailed description of the structure of my improved electromagnetic device, its mode of operation may now be readily followed. The winding 12 is normally energized by direct current of rated value flowing from bus bar 20 to the protected circuit which is connected to terminal screw 24. Under this condition, the attractive force exerted by the magnetic flux established in frame member 13 is insufficient to overcome the bias force of spring 34, and armature 14 will remain in its normal position. When an overcurrent condition develops, the magnetic flux produced by winding 12 will increase, but the increased flux cannot immediately reach the magnetic circuit provided by frame 13 and armature 14. The increasing lines of flux issuing from winding 12 must first cross the electroconductive sheath or casing 11, and as a result voltage is induced in the casing. As is well known to those skilled in the art, this induced voltage sets up circulating eddy currents in casing 11, whereby additional magnetic flux is produced tending to oppose the initial change in flux and delay the appearance of the increased flux outside the casing. In other words, due to the induced eddy currents, a time lag is introduced between a change in energizing current and a corresponding change in the flux appearing in the magnetic circuit.

The flux in the magnetic circuit and the attractive force produced thereby must increase a predetermined amount in order to overcome the bias force of spring 34 and move armature 14 toward its attracted position. This predetermined increase cannot be realized until an overcurrent condition has persisted for a length of time that is determined by the rate-of-change of energizing current. The overall time required for relay operation will be least, in spite of relatively greater eddy currents and the delaying function performed thereby, when the energizing current is increasing at its greatest rate, such as during the most severe overcurrent condition. Consequently, the desired inverse operating characteristic is obtained.

The effectiveness of casing 11 to delay relay operation is related to the resistance of the casing and thereby to the thickness of its walls. By increasing thickness, the resistance of the walls is decreased and the magnitude of eddy currents becomes relatively greater, whereby a longer period of time is required for the changing energizing current to be reflected by a corresponding change in the magnetic flux in frame 13 and armature 14. Since each line of flux issuing from winding 12 and eventually reaching the magnetic path provided by frame 13 must pass through or link casing 11, I am able to obtain by the eddy current induction principle an exceptionally long time delay for a relay of given size and current rating.

In accordance with my invention, the casing 11 provides a continuous electroconductive shield between frame 13 and all surfaces of the helical winding 12. Energizing winding 12 may be considered a primary winding, and the casing 11 functions as a short-circuited secondary winding which, as is well known to those skilled in the art, is effective to reduce the equivalent impedance of the primary winding. Accordingly, the energizing winding 12 presents extremley low inductive reactance to changing current in the circuit being protected by the relay. By totally enclosing winding 12, casing 11 is unusually effective in reducing primary impedance, since leakage flux is reduced to a minimum, that is, substantially every line of flux issuing from winding 12 links the casing 11.

The mounting arrangement described in detail hereinbefore tends further to reduce the inductive reactance introduced by the electromagnetic relay in the protective circuit. A simplified wiring arrangement is obtained by mounting the relay directly on bus bar 20 and having the end wall 17 of casing 11 serve as one energizing terminal of winding 12. In addition, this feature of my invention conserves space and contributes to compactness.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patents of the United States is:

1. In an electromagnetic device, magnetic flux producing means comprising a winding adapted to be energized by electric current, a magnetizable frame member disposed to provide a magnetic path for the flux produced by said winding, a magnetizable armature attached to said frame member and disposed for movement by electromagnetic attraction in response to at least a predetermined amount of flux produced by an appropriate magnitude of energizing current in said winding, means for delaying movement of said armature when the energizing current is increased to said appropriate magnitude comprising a non-magnetic electroconductive casing wholly surrounding said winding and at least one relatively small opening in said casing for accommodating an electric current conductor which comprises an end of said winding.

2. In an electromagnetic device, a helical winding having terminals adapted to be energized by direct current, said winding being substantially completely incased by a non-magnetic electroconductive jacket comprising cylinder-shaped inner and outer side walls and ring-shaped end walls, a relatively small opening in at least one of said walls providing access to at least one of the terminals of said winding, a magnetizable frame comprising at least two spaced apart elongated members attached at one end to a common transverse member, said jacket being disposed on one of said elongated members, and a movable magnetizable armature disposed transversely across the other end of each of said elongated members, whereby said frame and said armature form a magnetic circuit for the magnetic flux produced upon energization of said winding.

3. In an electromagnetic relay, a magnetizable frame member including an elongated core, a contact carrying armature disposed in cooperating relationship with said frame member for movement between a normally unattracted position and a magnetically attracted position, a non-magnetic electroconductive spool including end flanges and an elongated hollow body portion disposed on said core, an electric current conductor wound on said body portion for establishing, when energized, a magnetic field tending to attract said armature, one end of said conductor being connected to said spool, a non-magnetic electroconductive cylinder connected to the end flanges of said spool to enclose the windings of said conductor and including a relatively small slot through which the other end of said conductor passes, a first energizing terminal comprising said other end of said conductor, and a second energizing terminal comprising one of said end flanges, said one end flange being disposed to provide suitable means for mounting the relay.

4. In an electromagnetic device, a magnetizable frame including an elongated core, a magnetizable armature disposed in cooperating relationship with said frame, a non-magnetic electroconductive hollow jacket comprising cylinder-shaped inner and outer side walls interconnected by ring-shaped end walls disposed on said core for supporting said frame, said jacket being adapted for mounting on an electroconductive support, an electric current conductor wound within said hollow jacket with one end being connected thereto, and an opening in one of the walls of said jacket through which the other end of said conductor passes, said other end and the jacket itself providing energizing terminals for said conductor.

5. An electromagnetic device comprising, a magnetizable frame member, a magnetizable armature associated with said frame member and supported for movement in response to the force of electromagnetic attraction, a magnetic flux producing winding for said frame member, a pair of input terminals for said winding energized by pulsating direct current, successive pulses of direct current occurring at a frequency greater than 100 times a second, and a non-magnetic electroconductive sheath disposed between said winding and said frame member and totally enclosing said winding except for an opening to accommodate at least one conductor interconnecting said winding and said terminals.

References Cited in the file of this patent

UNITED STATES PATENTS

| 260,652 | Brush | July 4, 1882 |
| 650,915 | Scribner et al. | June 5, 1900 |
| 1,907,494 | Brogger | May 9, 1933 |

FOREIGN PATENTS

| 475,870 | Germany | May 24, 1929 |